United States Patent

Riggins, Sr.

[11] 4,189,844
[45] Feb. 26, 1980

[54] CHALK LINE PROTRACTING TOOL

[76] Inventor: Robert J. Riggins, Sr., 5150 Mercury Ct., Boise, Id. 83705

[21] Appl. No.: 965,943

[22] Filed: Dec. 4, 1978

[51] Int. Cl.² ............................................. G01B 19/62
[52] U.S. Cl. ....................................... 33/414; 33/332; 33/339; 33/374
[58] Field of Search ..................... 33/86, 87, 137, 138, 33/1 LE, 332, 339, 161, 374, 282, 414, 413

[56] References Cited

U.S. PATENT DOCUMENTS

| 1,654,164 | 12/1927 | Eldridge | 33/138 |
| 2,376,407 | 5/1945 | Wells | 33/393 X |

FOREIGN PATENT DOCUMENTS

| 496700 | 4/1930 | Fed. Rep. of Germany | 33/87 |
| 867679 | 8/1941 | France | 33/353 |
| 1512630 | 1/1968 | France | 33/87 |
| 271484 | 5/1927 | United Kingdom | 33/339 |

Primary Examiner—Harry N. Haroian
Attorney, Agent, or Firm—Paul F. Horton

[57] ABSTRACT

A chalk line protracting tool comprising a housing defining a compartment for holding chalk and line; a chalk line guide; and a level. A chalk line is fed from a manually operated reel, through an aperture between the compartment and the exterior of the housing, in a straight line to the guide and is protracted in a continued straight line for a desired distance where the line may be snapped against a surface for marking. The level is in a known angular relationship with the aperture guide axis whereby a protracted chalk line along the axis may provide a marking of desired length and at a known angle relative to level.

2 Claims, 4 Drawing Figures

CHALK LINE PROTRACTING TOOL

BACKGROUND OF THE INVENTION

1. Field of the Invention

This invention relates in general to layout tools, and in particular to a chalk line protracting tool in combination with a level.

2. Description of the Prior Art

The dependency of the construction industry and related industries on the common level is well known. Levels are used extensively for the marking and placement of structures level to ground and at various inclinations relative to ground level. Levels in general usage include a housing having a pair of parallel straight edges and one or more spirit levels at right angles or at 45° angles located within the housing and between the straight edges. For placement of finishing elements in construction, as for example, wallpaper, levels are placed against a vertical surface; earth level is ascertained; and a line is proscribed against the straight edge of the level by conventional marking means such as pens or pencils. Where lines greater in length than the level straight edge are desired, a conventional chalk line placed in alignment with the marking on the surface so proscribed is extended to the desired length and snapped to provide an extended or protracted line in known relationship with ground level. Conventional chalk lines as typified by U.S. Pat. No. 873,686 issued to A. B. Sharp and U.S. Pat. No. 3,691,639 issued to Roeseler et al are in common use.

In the past, separate instruments, first for leveling, and second for marking, have been required for proscribing a line. Such usage is inefficient, time consuming, and costly in terms of man hours wasted.

SUMMARY OF THE INVENTION

The present invention comprises a chalk line protracting tool comprising a level, a chalk line holder, and a chalk line guide means. A further and more complete description of the invention may be found in the appended claims.

It is therefore an object of the present invention to provide a layout tool which includes means for determining ground level and means for marking a straight line on a vertical surface in known angular relationship to the level.

It is a further object of the present invention to provide a layout tool having means for protracting and marking a line beyond the physical dimensions of the tool.

It is a further object of the present invention to provide a tool which provides simultaneous leveling and marking.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
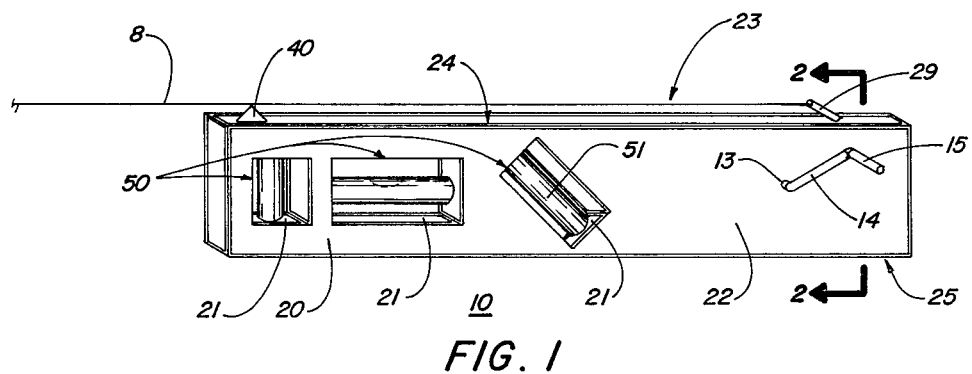
FIG. 1 is a perspective view of one embodiment of the present invention.

Referring now to the drawings, and more particularly, to FIG. 1, an embodiment to be preferred of a chalk line protracting tool 10, made according to the present invention is disclosed. Protracting tool 10 includes a housing 20, chalk line holding means 30, a chalk line guide 40 and level indicating means, designated generally by the numeral 50.

Figure 2:
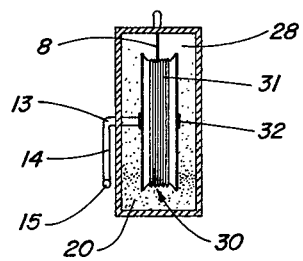
FIG. 2 is a sectional view along lines 2—2 of FIG. 1.
Figure 3:
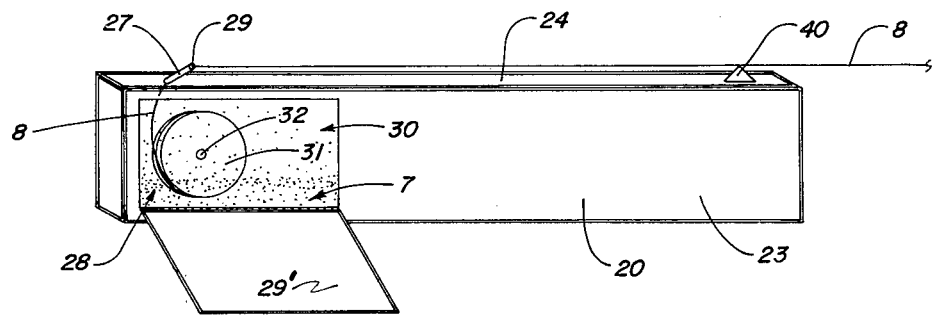
FIG. 3 is a perspective view of the device of FIG. 1 as shown from an opposing side.

The body of the chalk line protracting tool of the present invention is in the nature of a substantially rectangular plastic or metallic housing 20. Housing 20, in one preferred embodiment, includes three notches or receptacles 21, preferably extending completely through housing 20 from front surface 22 to back surface 23. Location of the notches within housing 20 is arbitrary; it being desirable that the notches be in horizontal alignment. Top surface 24 and bottom surface 25 are parallel and define substantially planar straight edges. Housing 20 is provided with a compartment 28, shown to advantage in FIGS. 2 and 3, operable to hold chalk 7 and chalk line 8. The housing is further provided with a closure member, hinged door 29, permitting entrance into compartment 28 for placement of chalk, replacement of chalk line, or for general servicing. Chalk line 8 may be wound upon a reel 31 located within compartment 28 and rotatably mounted to the housing by shaft 32 which is journaled transversly through sidewall 22 of the housing. One end of shaft 32, terminating within the housing, may be provided with a standard washer and nut for holding the reel in place and may be further provided with a clutch, not shown, for controlling ease of rotation of the reel. The opposing end of shaft 32 is provided with a head 13 pivotally attached in conventional manner to an arm 14 having an operating knob 15. The pivotal engagement of arm 14 to head 13 permits outward rotation of the arm relative to the head for ease of operation and also permits folding of the arm against the outside of casing 20 for storage. Housing 20 is provided with an aperture extending between compartment 28 and planar top portion 24, as may be seen to advantage in FIG. 3. The aperture, designated by numeral 29 is formed in the housing preferably by means of a tube 27 formed or attached at an angle of approximately 45° to planar top portion 24 toward and in unobstructed alignment with guide 40. Tube 27 projects above surface 24 approximately 2-5 millimeters at a height equal to the apex of guide 40 so that a chalk line extending from the outermost opening of tube 27 through the apex of guide 40 is parallel with the top surface 24 of housing 20. Tube 27 may be equipped with a liner, not shown, adjacent its outermost end, having a diameter substantially equal to the chalk line to prevent excessive withdraw of chalk on the line.

Figure 4:
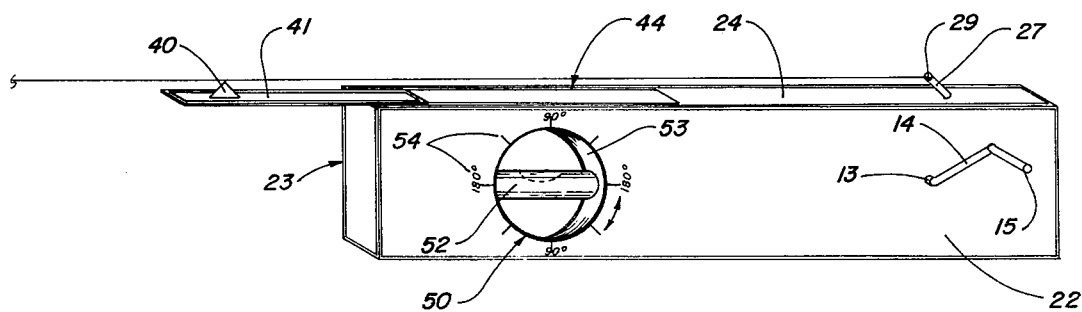
FIG. 4 shows an embodiment of the present invention including a rotatable spirit level and an extension member for the chalk line guide.

Level indicating means 50, in a first embodiment, includes three spirit levels, one of which is mounted within a receptacle 21 parallel with top and bottom surfaces of the housing, a second of which is mounted in another aperture 21 perpendicular to the first level, and optionally a third spirit level mounted at an angle of 45° in relationship to the first spirit level. A second embodiment of the level indicating means of the present invention is shown in FIG. 4 of the drawings. In this embodiment a conventional spirit level 52 is fixed to a hub 53 journaled for rotation in housing 20. Housing 20 contains on opposing planar sides 22 and 23, respectively, about the periphery of hub 53, angular markings 54 denoting degrees of rotation from ground level. Hub 53 frictionally engages housing 20 so that spirit level 52 may be rotated and set at will.

Chalk line guide means 40 may be attached directly to housing 20, on top surface 24, adjacent an end opposite to aperture 29 so that a chalk line threaded through aperture 29 may be brought in alignment therewith. In the preferred embodiment, guide means 40 takes the form of a substantially triangular flange having its apex rising above planar surface 24 to a height equal to the opening of aperture 29. While a triangular flange is preferred, it is to be understood that a great many configurations might be similarly suited. In a second embodiment, guide means 40 is attached adjacent a terminal end of a guide means extension member 41, as shown in FIG. 4. Extension member 41 slidably engages top portion 24 of housing 20 by means of slots 44 formed within the housing. Extension member 41 is provided with a planar top surface coplanar with the top portion 24 of the housing. By sliding extension member 41 to its full extension from housing 20, it will be seen that guide 40 becomes further removed from aperture 29 thereby providing a greater degree of accuracy in protraction of the chalk line along the aperture guide means axis. It is essential that extension member 41 retain its planar relationship with the top surface 24 of housing 20 and therefore its known relationship to level indicating means 50.

In readying apparatus 10 for operation, standard chalk line 8 is wound about reel 31 in conventional manner with one end of the chalk line threaded through and extending from aperture 29. Powdered chalk, preferrably blue in color, is installed into chalk compartment 28 and is retained therein by closure of member 29'. A knot or knob may be placed at the exterior end of chalk line 8 to prevent accidental retraction back into compartment 28. In operation, and assuming the use of the embodiment as shown in FIG. 4, spirit level 52 is placed in a desired rotational relationship to the aperture guide means axis which is parallel with planar surface 24 of housing 20. If it is desired to protract and mark a line parallel to ground level, spirit level 52 is rotated to the 180°—180° markings; apparatus 10 is then placed with one side flush against a vertical wall and positioned so that spirit level 52 indicates that the apparatus is level with ground. Line 8 is then withdrawn through tube 27 and aperture 29 and is protracted beyond guide means 40 and aligned with the apex of the guide. The chalk line then may be snapped against the wall in conventional manner, leaving a blue mark level to ground. It is obvious that a mark of any desired length can thereby be made. Chalk line 8 is then wound back upon spool 31 by rotating the spool by means of handle 14. Now, for example, assume that a line 45° from ground level and having an upward inclination from a particular point is desired. Spirit level 52 is then rotated 45° in a counter-clockwise direction, on apparatus as shown in the position of FIG. 4, and set at that position. In the same manner as previously described, apparatus 10 is placed with one side flush against a vertical wall; the apparatus is turned upwardly until spirit level 52 indicates level; line 8 is pulled through aperture 29 and in alignment with the apex of guide 40 and is protracted a desired distance beyond. The line is then snapped against the wall to provide a mark extending upwardly 45° from ground level. It will therefore be seen that a great number of angular markings may thereby be provided. The embodiment as shown in FIG. 1 is used in substantially the same way, except the apparatus is limited to markings of level, 45°, and 90° to ground level.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A chalk line protracting tool comprising:
   a substantially rectangular housing having a planar top portion, said housing including a chalk line compartment and a closure member operable to open and close the compartment for replacement of chalk and servicing of a chalk line holding means;
   a tubular member communicating with the chalk line compartment and terminating above said planar top portion a predetermined distance, said tubular member adapted for threading a chalk line therethrough;
   a chalk line holding means including a reel rotatably mounted to the interior of the housing compartment and a handle exterior to the housing, pivotally attached to said reel and adapted to fold downwardly upon, and substantially flush with, the exterior surface of said housing for storage thereof;
   chalk line guide means attached to said housing and extending above the planar top portion a distance equal in distance to the uppermost terminal opening of said tubular member and in unobstructed alignment with the opening;
   level indicating means including at least two spirit levels carried by said housing in planar right angular relationship to one another, one of said spirit levels in planar parallel relationship with the top portion of said housing whereby a chalk line rectilinearly extending between the tubular opening and said guide means and protracted beyond said guide means is operable to mark such protraction on a selected surface relative to level.

2. The apparatus as described in claim 1 further comprising a guide means extension member slidably engaging said housing adjacent said planar top portion, said extension member carrying said guide means and operable to extend said guide means parallel with said top portion beyond the main body portion of said housing.

* * * * *